US012626251B2

(12) United States Patent
Avudaiappan et al.

(10) Patent No.: US 12,626,251 B2
(45) Date of Patent: May 12, 2026

(54) SYSTEMS AND METHODS FOR PREDICTIVE MODELLING OF CLEARING MESSAGES

(71) Applicant: MASTERCARD INTERNATIONAL INCORPORATED, Purchase, NY (US)

(72) Inventors: Shanmuga Vidya Avudaiappan, Frisco, TX (US); Matt Froidl, Saint Louis, MO (US); Tracy McLaughlin, St. Charles, MO (US); Stephanie Detchemendy, Wentzville, MO (US); Dennis Hill, O'Fallon, MO (US); Mariya Ivanyshyn Spaeth, New York, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 18/350,528

(22) Filed: Jul. 11, 2023

(65) Prior Publication Data

US 2025/0021973 A1     Jan. 16, 2025

(51) Int. Cl.
G06Q 20/38          (2012.01)
G06Q 20/40          (2012.01)

(52) U.S. Cl.
CPC ......... G06Q 20/389 (2013.01); G06Q 20/401 (2013.01)

(58) Field of Classification Search
CPC ........................... G06Q 20/389; G06Q 20/401

(Continued)

(56) References Cited

U.S. PATENT DOCUMENTS 8,010,422 B1     8/2011  Lascelles et al.
10,796,303 B2   10/2020  Dutta
(Continued)

FOREIGN PATENT DOCUMENTS

JP      2001344548 A    12/2001
WO      2018005635 A2    1/2018

OTHER PUBLICATIONS

A. Roy, J. Sun, R. Mahoney, L. Alonzi, S. Adams and P. Beling, "Deep learning detecting fraud in credit card transactions," 2018 Systems and Information Engineering Design Symposium (SIEDS), Charlottesville, VA, USA, 2018, pp. 129-134 (Year: 2018).*

(Continued)

*Primary Examiner* — Virpi H Kanervo
(74) *Attorney, Agent, or Firm* — Armstrong Teasdale LLP

(57)          ABSTRACT

A modelling platform including at least one processor in communication with a memory device and a payment processor is provided. The at least one processor is configured to retrieve subsets of data from a transaction history database, derive training data sets from the subsets, apply model input data fields of each training data set as inputs to one or more machine learning models, and apply a machine learning algorithm to adjust parameters of the one or more machine learning models. The at least one processor is also configured to upload at least one trained machine learning model to an operational predictive model module, apply a stream of real-time authorization request messages as inputs to the at least one trained machine learning model, and transmit, to the payment processor in real-time or near real-time, values of at least one output obtained by applying the stream.

20 Claims, 3 Drawing Sheets

(58) Field of Classification Search
USPC ............................................................ 705/44
See application file for complete search history.

(56) References Cited

U.S. PATENT DOCUMENTS

| | | | |
|---|---|---|---|
| 10,915,900 B1 | 2/2021 | Higgins et al. | |
| 10,937,030 B2 * | 3/2021 | Allbright | G06N 20/00 |
| 11,244,333 B2 | 2/2022 | Song | |
| 11,423,401 B2 * | 8/2022 | Mori | G06Q 20/102 |
| 12,118,559 B2 * | 10/2024 | Wong | G06N 3/08 |
| 12,165,017 B1 * | 12/2024 | Grossman | G06F 17/17 |
| 12,423,702 B2 * | 9/2025 | Ranjan | G06N 20/20 |
| 2020/0394651 A1 | 12/2020 | Kreder, III | |
| 2021/0125179 A1 | 4/2021 | Mach et al. | |
| 2021/0142297 A1 | 5/2021 | Mathew | |
| 2021/0192641 A1 | 6/2021 | Das et al. | |
| 2022/0164699 A1 * | 5/2022 | Neupane | G06N 20/00 |
| 2022/0270168 A1 | 8/2022 | Daya et al. | |
| 2022/0300755 A1 | 9/2022 | Vyas | |
| 2022/0335429 A1 * | 10/2022 | Dhama | G06Q 20/4016 |
| 2022/0366412 A1 | 11/2022 | Mori et al. | |
| 2023/0029024 A1 * | 1/2023 | Menon | G06Q 20/4016 |
| 2024/0028975 A1 | 1/2024 | Kan et al. | |
| 2024/0037557 A1 * | 2/2024 | Stankey | G06Q 40/06 |
| 2024/0037579 A1 * | 2/2024 | Stankey | G06Q 30/0202 |

OTHER PUBLICATIONS

A. Dal Pozzolo, G. Boracchi, O. Caelen, C. Alippi and G. Bontempi, "Credit Card Fraud Detection: A Realistic Modeling and a Novel Learning Strategy," in IEEE Transactions on Neural Networks and Learning Systems, vol. 29, No. 8, pp. 3784-3797, Aug. 2018 (Year: 2018).*

Koeppl, Thorsten, Cyril Monnet, and Ted Temzelides. "Optimal clearing arrangements for financial trades." Journal of Financial Economics 103.1 (2012): 189-203. (Year: 2012).*

PCT International Search Report and Written Opinion, Application No. PCT/US2024/036366, dated Oct. 28, 2024, 9 pages.

* cited by examiner

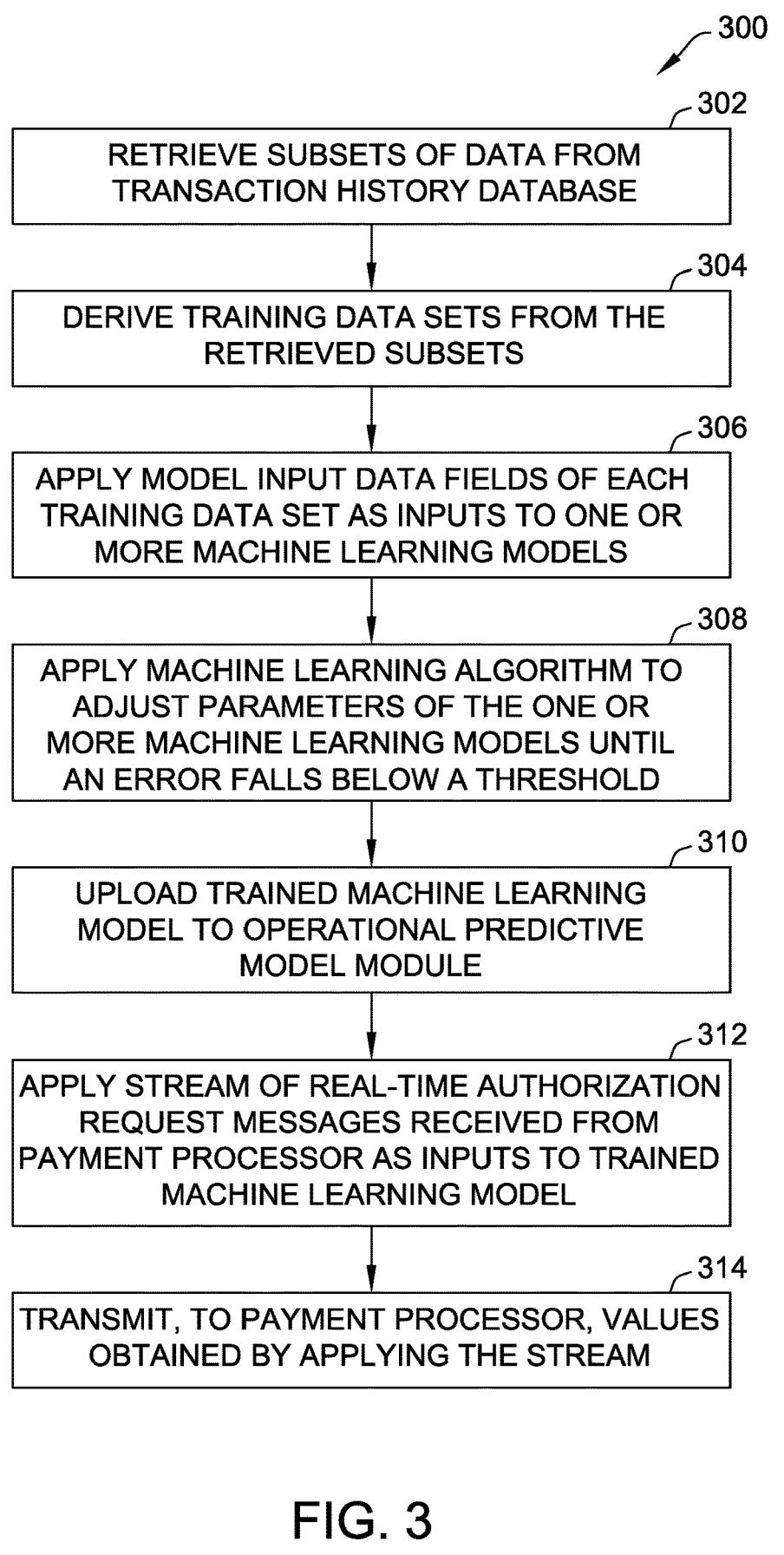

300

302

RETRIEVE SUBSETS OF DATA FROM
TRANSACTION HISTORY DATABASE

304

DERIVE TRAINING DATA SETS FROM THE
RETRIEVED SUBSETS

306

APPLY MODEL INPUT DATA FIELDS OF EACH
TRAINING DATA SET AS INPUTS TO ONE OR
MORE MACHINE LEARNING MODELS

308

APPLY MACHINE LEARNING ALGORITHM TO
ADJUST PARAMETERS OF THE ONE OR
MORE MACHINE LEARNING MODELS UNTIL
AN ERROR FALLS BELOW A THRESHOLD

310

UPLOAD TRAINED MACHINE LEARNING
MODEL TO OPERATIONAL PREDICTIVE
MODEL MODULE

312

APPLY STREAM OF REAL-TIME AUTHORIZATION
REQUEST MESSAGES RECEIVED FROM
PAYMENT PROCESSOR AS INPUTS TO TRAINED
MACHINE LEARNING MODEL

314

TRANSMIT, TO PAYMENT PROCESSOR, VALUES
OBTAINED BY APPLYING THE STREAM

FIG. 3

SYSTEMS AND METHODS FOR PREDICTIVE MODELLING OF CLEARING MESSAGES

BACKGROUND

This disclosure relates generally to electronic payment networks, and more specifically to systems and methods for developing, training, and applying machine learning models to predict parameters of a clearing message corresponding to a particular authorization message.

Electronic payment networks are in widespread use to communicate information needed to process transactions between a payment account holder, an issuer of the payment account (e.g., a bank that issued a payment account to the account holder) a merchant, and an acquirer (e.g., a bank that provides a merchant account for use on the payment network). The transaction may involve presentment at a point-of-sale terminal of a physical payment card (e.g., a credit card, debit card, or prepaid card) linked to the payment account, use of a device that includes payment account information and digital payment capability (e.g., a smart phone device including a digital wallet that holds payment account information), manually entered payment account information via another device such as a computer device interfacing with a merchant's online platform, and payment account information stored by a merchant platform and used to initiate recurring payments previously consented to by the account holder. Sophisticated multi-party electronic payment networks are known to process payment account transactions, confirm authorized charges, manage payments and transfer of funds (settlement), confirm payment status, and compute available balances. Account holders may easily retrieve information online to check their pending and historical account charges and available balances whenever desired.

In many electronic payment networks, account issuers receive authorization request messages in real time, typically from a merchant, as transactions takes place. Each authorization request message identifies a payment account and a tentative transaction amount for transfer to the merchant from the payment account. If the transaction is authorized, the account issuer places a hold on funds in the payment account corresponding to the tentative transaction amount. However, the actual amount for transfer to the merchant from the payment account is not established, and settlement of funds is not initiated, until the account issuer receives a follow-up clearing message via the payment network.

Until the clearing message is received, the account issuer's records reflect only a pending charge for the tentative amount. Yet, in some cases it can take anywhere from hours to days to several weeks after the authorization for the account issuer to receive a clearing message. Non-limiting examples include payment card authorizations used to reserve a hotel stay, where no clearing message is sent until a final cost is established upon completion of the stay; online orders for future delivery in which no clearing message is sent until the order fulfillment date; and instances in which a clearing message is simply delayed due to erroneous data input or software events occurring at the merchant or acquirer. Moreover, in some cases the actual amount of the transaction differs from the tentative amount cited during authorization. For example, the cost of ordered goods may change before the fulfillment date, or the incidentals purchased during a hotel stay may increase the actual billed amount at clearing.

Clearing message latency can cause account holders to be confused by seeing incorrect amounts when they check their balances with the account issuer. In addition, account issuers are deprived of liquidity as they hold funds in reserve for satisfaction of an expected clearing message. An inability to predict when a clearing message will arrive for such authorized transactions limits an ability of account issuers to plan and adjust their operations on a daily basis. For example, but not by way of limitation, the information provided in authorization request messages to issuers of debit cards and issuers of prepaid cards may be too limited to enable the issuer to draw any conclusions about clearing message timing.

In addition, in some circumstances a clearing message is never communicated for certain authorized transactions. Non-limiting examples include orders which are cancelled by the account holder or merchant after the initial authorization, but for which notice of the cancellation is not submitted properly to the electronic payment network. Moreover, in some instances a clearing message is simply never sent due to erroneous data input or software events occurring at the merchant or acquirer. It is difficult for account issuers to determine whether or when pending charges/held funds from a previously authorized transaction should be released on the expectation that no clearing message is forthcoming.

BRIEF DESCRIPTION

In one aspect, a modelling platform including at least one processor in communication with a memory device and a payment processor is provided. The at least one processor is configured to retrieve subsets of data from a transaction history database, where the transaction history database stores data extracted from authorization messages and clearing messages for a plurality of authorized transactions processed by the payment processor. The at least one processor is also configured to derive training data sets from the retrieved subsets, where each training data set corresponds to one of the plurality of authorized transactions and includes model input data fields and at least one result data field, each at least one result data field representing a clearing message parameter for the authorized transaction. The at least one processor is further configured to apply the model input data fields of each training data set as inputs to one or more machine learning models, where each of the one or more machine learning models is configured to produce, for each training data set, at least one output intended to correspond to a value of the at least one result data field of the training data set.

In addition, the at least one processor is configured to apply a machine learning algorithm to adjust parameters of the one or more machine learning models until an error between the at least one output and the at least one result data field falls below a threshold, and in response to the error falling below the threshold, upload at least one trained machine learning model of the one or more machine learning models to an operational predictive model module. The at least one processor is also configured to apply a stream of real-time authorization request messages received from the payment processor as inputs to the at least one trained machine learning model, and transmit, to the payment processor in real-time or near real-time, values of the at least one output obtained by applying the stream.

In another aspect, a computer-implemented method using a modelling platform including at least one processor in communication with a memory device and a payment processor is provided. The method includes retrieving subsets of data from a transaction history database, where the transaction history database stores data extracted from authorization messages and clearing messages for a plurality of authorized transactions processed by the payment processor. The method also includes deriving training data sets from the retrieved subsets, where each training data set corresponds to one of the plurality of authorized transactions and includes model input data fields and at least one result data field, each at least one result data field representing a clearing message parameter for the authorized transaction. The method further includes applying the model input data fields of each training data set as inputs to one or more machine learning models, where each of the one or more machine learning models is configured to produce, for each training data set, at least one output intended to correspond to a value of the at least one result data field of the training data set.

In addition, the method includes applying a machine learning algorithm to adjust parameters of the one or more machine learning models until an error between the at least one output and the at least one result data field falls below a threshold, and in response to the error falling below the threshold, uploading at least one trained machine learning model of the one or more machine learning models to an operational predictive model module. The method includes applying a stream of real-time authorization request messages received from the payment processor as inputs to the at least one trained machine learning model, and transmitting, to the payment processor in real-time or near real-time, values of the at least one output obtained by applying the stream.

In yet another aspect, at least one non-transitory computer-readable storage medium that includes computer-executable instructions embodied thereon is provided. When the computer-executable instructions are executed by at least one processor of a modelling platform in communication with a memory device and a payment processor, the computer-executable instructions cause the at least one processor to retrieve subsets of data from a transaction history database, where the transaction history database stores data extracted from authorization messages and clearing messages for a plurality of authorized transactions processed by the payment processor. The computer-executable instructions also cause the at least one processor to derive training data sets from the retrieved subsets, where each training data set corresponds to one of the plurality of authorized transactions and includes model input data fields and at least one result data field, each at least one result data field representing a clearing message parameter for the authorized transaction. The computer-executable instructions further cause the at least one processor to apply the model input data fields of each training data set as inputs to one or more machine learning models, where each of the one or more machine learning models is configured to produce, for each training data set, at least one output intended to correspond to a value of the at least one result data field of the training data set.

In addition, the computer-executable instructions cause the at least one processor to apply a machine learning algorithm to adjust parameters of the one or more machine learning models until an error between the at least one output and the at least one result data field falls below a threshold, and in response to the error falling below the threshold, upload at least one trained machine learning model of the one or more machine learning models to an operational predictive model module. The computer-executable instructions also cause the at least one processor to apply a stream of real-time authorization request messages received from the payment processor as inputs to the at least one trained machine learning model, and transmit, to the payment processor in real-time or near real-time, values of the at least one output obtained by applying the stream.

BRIEF DESCRIPTION OF THE DRAWINGS

FIGS. 1-3 show example embodiments of the methods and systems described herein.

FIG. 1 is a schematic diagram illustrating an example multi-party payment processing system in communication with a platform for predictive modelling of clearing message timing.

FIG. 2 is a schematic diagram of an example server computing device that maybe used with the computer system shown in FIG. 3.

FIG. 3 is a flow diagram of an example process for predictive modelling of clearing message parameters.

DETAILED DESCRIPTION OF THE DISCLOSURE

Figure 1:
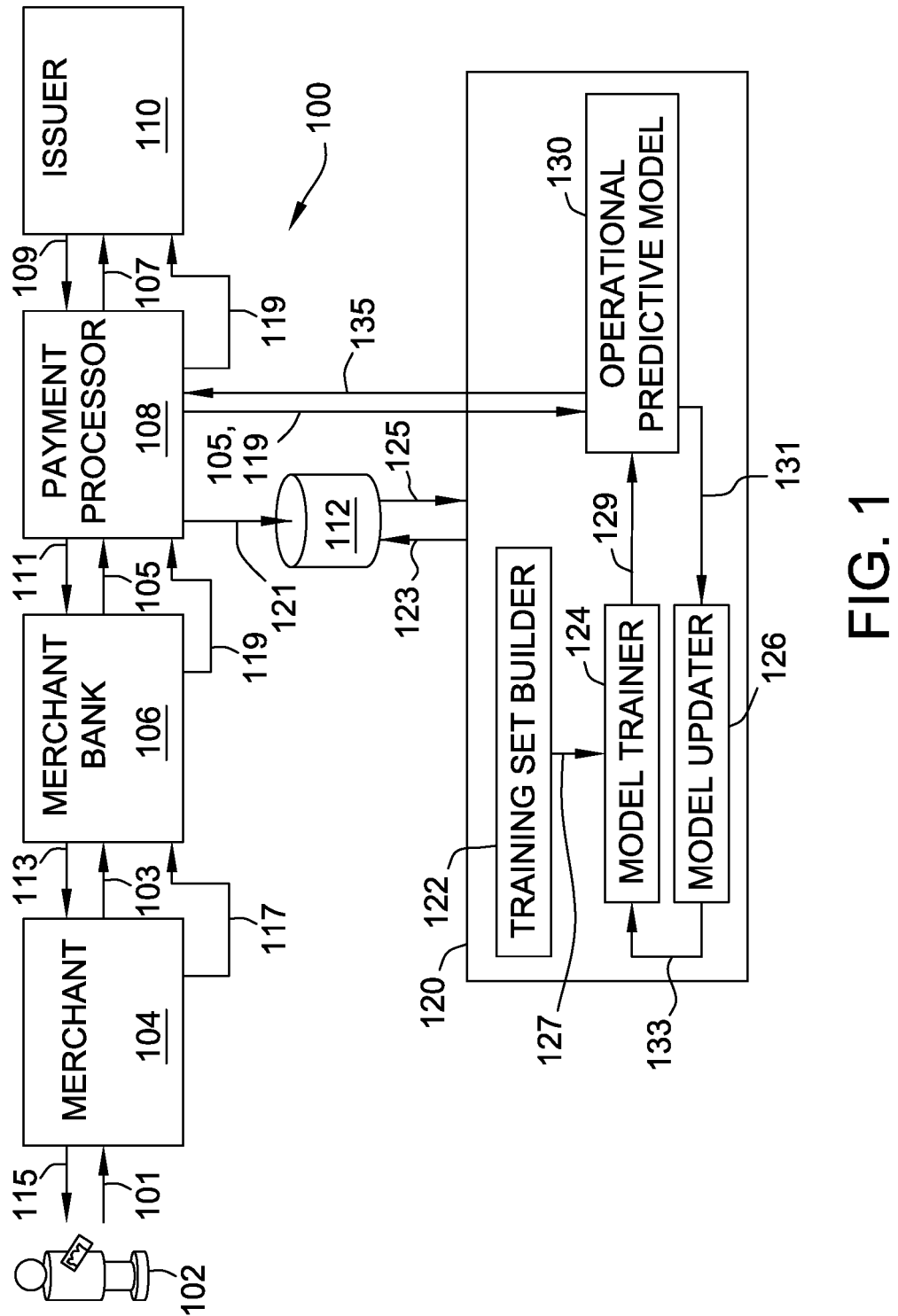

The following detailed description illustrates embodiments of the disclosure by way of example and not by way of limitation. The description enables one skilled in the art to make and use the disclosure, describes several embodiments, adaptations, variations, alternatives, and uses of the disclosure, including what is presently believed to be the best mode of carrying out the disclosure. The system and methods described herein are configured to address certain problems and challenges in predicting the timing of a clearing message corresponding to any given authorized transaction. Such problems and challenges are further discussed below followed by example systems and methods that overcome such problems and challenges.

Example embodiments of the disclosure include a computer-implemented modelling platform in communication with a payment processor network that routes and processes communications for authorizing and clearing transactions. The modelling platform is configured to produce machine learning models trained to make accurate predictions of one or more clearing message parameters for a given transaction, in response to inputs derived from an authorization request message routed to the payment processor for the transaction based on upon historical authorization request messages and corresponding clearing messages. The modelling platform may provide the prediction for each authorization request message back to the payment processor in real-time or near-real time with respect to initiation of the transaction (e.g., during the processing of the transaction), which enables the payment processor to embed the predicted clearing message parameters in the authorization request message before routing it to an issuer of the payment account used for the transaction. The predicted clearing message parameters for each transaction enable account issuers, and particularly (but not only) issuers of debit cards and issuers of prepaid cards, to better update balances shown to account holders, manage liquidity by adjusting funds in reserve for satisfaction of expected clearing messages based on the predictions, and/or determine whether or when pending charges/held funds from a previously authorized transaction should be released on the expectation that no clearing message is forthcoming, for example.

In example embodiments, the modelling platform includes a training set builder module that retrieves subsets of data from a transaction history database. The transaction history database may store data extracted from authorization messages and clearing messages for a plurality of authorized transactions processed by the payment processor. The training set builder module derives training data sets that include model input data fields and at least one result data field. Each at least one result data field represents a clearing message parameter for the authorized transaction. The modelling platform also includes a model trainer module that applies the model input data fields of each training data set as inputs to one or more machine learning models each programmed to produce, for each training data set, at least one output intended to correspond to a value of the at least one result data field of the training data set. The model trainer module applies a machine learning algorithm to adjust parameters of the one or more machine learning models until an error between the at least one output and the at least one result data field falls below a threshold, and uploads at least one trained machine learning model of the one or more machine learning models to an operational predictive model module of the modelling platform.

In example embodiments, the operational predictive model module applies a stream of real-time authorization request messages received from the payment processor as inputs to the at least one trained machine learning model, and transmits, to the payment processor in near real-time, values of the at least one output obtained by applying the stream. The operational predictive model module then provides the prediction for each authorization request message back to the payment processor in near-real time with respect to initiation of the transaction, which enables the payment processor to embed the predicted clearing message parameters in the authorization request message to the account issuer for use as described above.

The technical problems addressed by the systems and methods of the disclosure include at least one of: (i) inability to accurately predict clearing parameters in real-time or near real-time with respect to initial authorization of a transaction (e.g., inability to build, train and re-train machine learning models to predict clearing parameters); (ii) inability of an account issuer computer-implemented customer portal to display accurate available funds balances to account holders based on uncertainty as to future clearing messages; (iii) inability of an account issuer to accurately determine an amount funds necessary to hold in reserve to satisfy future clearing messages; and (iv) inability of an account issuer to accurately determine whether or when pending charges/held funds from a previously authorized transaction should be released on the expectation that no clearing message is forthcoming.

The systems and methods of the disclosure may be implemented using computer programming or engineering techniques including computer software, firmware, hardware, or any combination or subset thereof, wherein the technical effects may be achieved by steps including one or more of (i) retrieving subsets of data from a transaction history database storing data extracted from authorization messages and clearing messages for a plurality of authorized transactions processed by a payment processor; (ii) deriving training data sets from the retrieved subsets, wherein each training data set corresponds to one of the plurality of authorized transactions and includes model input data fields and at least one result data field, each at least one result data field representing a clearing message parameter for the authorized transaction; (iii) applying the model input data fields of each training data set as inputs to one or more machine learning models each programmed to produce at least one output intended to correspond to a value of the at least one result data field of the training data set; (iv) applying a machine learning algorithm to adjust parameters of the one or more machine learning models until an error between the at least one output and the at least one result data field falls below a threshold; (v) uploading at least one trained machine learning model to an operational predictive model module that applies a stream of real-time authorization request messages received from the payment processor as inputs to the at least one trained machine learning model; and (vi) transmitting, to the payment processor, e.g., in near real-time, values of the at least one output obtained by applying the stream.

The resulting technical benefits achieved by the systems and methods of the disclosure include at least one of: (i) accurately predicting clearing parameters in real-time or near real-time with respect to initial authorization of a transaction; (ii) enabling an account issuer computer-implemented customer portal to display accurate available funds balances to account holders even before some clearing messages are received; (iii) enabling an account issuer to accurately determine an amount funds necessary to hold in reserve to satisfy future clearing messages; and (iv) enabling an account issuer to accurately determine whether or when pending charges/held funds from a previously authorized transaction should be released on the expectation that no clearing message is forthcoming.

In some embodiments, a computer program is provided, and the program is embodied on a computer-readable medium. In an example embodiment, the system may be executed on a single computer system, without requiring a connection to a server computer. In a further example embodiment, the system may be run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Apple Inc. located in Cupertino, CA). In yet a further embodiment, the system is run on a Mac OS® environment (Mac OS is a registered trademark of Apple Inc. located in Cupertino, CA). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In some embodiments, a computer program is provided, and the program is embodied on a computer-readable medium and utilizes a Structured Query Language (SQL) with a client user interface front-end for administration and a web interface for standard user input and reports. In another embodiment, the system is web enabled and is run on a business entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Washington).

The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus, are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the system and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, any type of virtual card (e.g. virtual cards generated by issuers and/or third party processors via mobile bank or desktop apps) and/or any other device that may hold payment account information, such as mobile phones, Smartphones, personal digital assistants (PDAs), key fobs, digital wallets, and/or computers. Each type of transactions card can be used as a method of payment for performing a transaction. As used herein, the term "payment account" is used generally to refer to the underlying account with the transaction card. In addition, cardholder card account behavior can include but is not limited to purchases, management activities (e.g., balance checking), bill payments, achievement of targets (meeting account balance goals, paying bills on time), and/or product registrations (e.g., mobile application downloads).

As discussed herein, the authorization messages and/or clearing messages may be in an ISO 8583 or ISO 20022 message format for processing over a dedicated payment processing network. As used herein, "ISO" refers to a series of standards approved by the International Organization for Standardization (ISO is a registered trademark of the International Organization for Standardization of Geneva, Switzerland). ISO 8583 compliant messages are defined by the ISO 8583 standard which governs financial transaction card originated messages and further defines acceptable message types, data elements, and code values associated with such financial transaction card originated messages. ISO 8583 compliant messages include a plurality of specified locations for data elements. ISO 20022 compliant messages are defined by the ISO 20022 standard. For example, ISO 20022 compliant messages may include acceptor to issuer card messages (ATICA).

FIG. 1 is a schematic diagram illustrating an example multi-party payment processing system 100 in communication with a modelling platform 120 for predictive modelling of clearing messages prior to the actual clearing message being sent. For example, payment processing system 100 may be implemented using the Mastercard® interchange network and/or other payment processing systems and networks. (Mastercard is a registered trademark of Mastercard International Incorporated located in Purchase, New York). The Mastercard interchange network uses a set of proprietary communications standards promulgated by Mastercard International Incorporated for the exchange of financial transaction data and the settlement of funds between financial institutions that are members of Mastercard International Incorporated.

In payment processing system 100, a financial institution, such as an issuing bank 110 (also referred to as issuer 110), issues a payment account, such as a credit card account, a debit card account, or a prepaid card, to an account holder 102 (also referred to as cardholder 102), who uses the payment card to tender 101 payment for a purchase from a merchant 104. To accept payment with the payment account, merchant 104 must normally establish an account with a financial institution that has established a relationship with a payment processor 108. This financial institution is usually called the "merchant bank" 106 or the "acquiring bank" 106 or simply "acquirer" 106. In FIG. 1, the functions of merchant bank 106 and issuer 110 are implemented by respective server computing systems operated by, or on behalf of, merchant bank 106 and issuer 110. In some cases, merchant bank 106 may authorize a third party to perform transaction processing on its behalf, and the third party maintains the server computing system used to implement some or all of the functions of merchant bank 106 as described herein. Such a third party may be called a "merchant processor" or an "acquiring processor." Likewise, in some cases, issuer 110 may authorize a third party to perform transaction processing on its behalf, and the third party maintains the server computing system used to implement some or all of the functions of issuer 110 as described herein. Such a third party may be called an "issuer processor."

The tender 101 may be accomplished in any number of ways, for example by physically swiping the payment card at a point-of-sale (POS) terminal of the merchant, by near-field communication (NFC) of information identifying the account from the payment card or a mobile computing device of the cardholder to the POS terminal, or by submitting information identifying the account electronically to an online merchant portal. In response to the tender 101 by cardholder 102, merchant 104 transmits a payment request message 103 requesting authorization from merchant bank 106 for the tentative amount of the purchase. The message 103 may be sent automatically by the POS terminal or online merchant portal, e.g. via electronic communication with the server computing system of merchant bank 106.

In response to the message 103, the server computing system of merchant bank 106 transmits an authorization request message 105 to the payment processor 108. Payment processor 108 maintains a server computing system or "switch" that implements the interchange network and is configured to efficiently route communications between the servers of merchant banks 106 and issuers 110. In the example embodiment, payment processor 108 may be configured to process and route messages having a constrained format, such as ISO 8583 compliant messages and/or ISO 20022 compliant messages. As used herein, "ISO" refers to a series of standards approved by the International Organization for Standardization (ISO is a registered trademark of the International Organization for Standardization of Geneva, Switzerland). The constrained format defines acceptable message types, data element locations, and data element values. ISO 8583 compliant messages are constrained by the ISO 8583 standard which governs financial transaction card originated messages ISO 20022 compliant messages are constrained by the ISO 20022 standard. For example, ISO 20022 compliant messages may include acceptor to issuer card messages (ATICA).

The server computing system of the payment processor 108 processes the authorization request message 105. The processing may include for example, adding additional data to specified data fields within the proprietary messaging format corresponding to value-added services performed by the payment processor 108. Payment processor then routes the processed message as authorization request message 107 to the server computing system of issuing bank 110. The server computing system of issuing bank 110 determines whether the tendered account is in good standing and whether the tentative amount of the purchase is covered by the available credit line or account balance of the tendered account. In response to these determinations, the server computing system of issuing bank 110 transmits an authorization response message 109 to payment processor 108, indicating whether the authorization request will be declined or accepted. The server computing system of payment processor 108 processes the authorization response message 109 and routes it, as authorization response message 111, to the server computing system of merchant bank 106. If the request is accepted, the server computing system of payment processor 108 assigns and stores a payment network reference number, such as the Banknet Reference Number used by Mastercard International Incorporated®, an authorization code, and/or other transaction identifiers that may be used to identify the transaction.

The server computing system of the merchant bank 106 in turn transmits a message 113 to the merchant 104 indicating the decline or acceptance. The message 113 may be sent automatically to the originating POS terminal or online merchant portal, e.g., via electronic communication with the server computing system of merchant bank 106. The merchant 104 may then communicate 115 personally or electronically with the cardholder 102 to permit or deny the purchase. When a request for authorization is accepted, the issuer decreases the available credit line or available account balance of the payment account by the tentative amount of the purchase, pending clearing and settlement.

After the authorization process described above, a clearing process is also implemented by payment processing system 100. Normally, a charge for an "authorized" transaction is not posted immediately to the payment account. For example, bankcard associations, such as Mastercard International Incorporated®, have promulgated rules that do not allow a merchant to charge, or "capture," a transaction until goods are shipped or services are delivered. When the merchant 104 ships or delivers the goods or services, merchant 104 captures the transaction by, for example, appropriate data entry procedures on the POS terminal or automated processes on the merchant's own server computing system triggered by the shipping notification, generating a capture notification message 117 to merchant bank 106. The capture notification message 117 includes the actual transaction amount to be transferred from the account holder's payment account to the account of the merchant at merchant bank 106. If the account holder 102 cancels a transaction before it is captured, a "void" is generated. If the account holder 102 returns goods after the transaction has been captured, a "credit" is generated.

In response to capture notification message 117, merchant bank 106 transmits a clearing message 119 to payment processor 108 with information relating to the purchase transaction, such as the actual transaction amount. In example embodiments, the clearing message 119 also conforms to the proprietary messaging format, e.g., based on ISO 8583 or ISO 20022 as discussed above. Payment processor 108 processes the clearing message 119 and routes it to issuing bank 110. No money is exchanged during clearing. Clearing (also referred to as "first presentment") involves the exchange of data required to identify the payment account, such as the account number, expiration date of the payment card, billing address, actual amount of the sale, and/or other transaction identifiers that may be used to identify the transaction, such as the payment network reference number initially assigned to the corresponding authorized transaction. As discussed above, in some cases it can take anywhere from hours to days to several weeks after receipt of the authorization process for the issuing bank 110 to receive clearing message 119. This latency can cause account holders 102 to be confused by seeing incorrect amounts when they check their balances with issuing bank 110. In addition, issuing bank 110 is deprived of liquidity as it holds funds in reserve for satisfaction of an expected clearing message 119. In addition, in some circumstances the clearing message 119 is never communicated for certain authorized transactions. At some point, issuing bank 110 would prefer to release pending charges/held funds from a previously authorized transaction if it becomes clear that no clearing message is forthcoming, however, conventional systems are unable to consistently and accurately predict a proper time interval after which it is unlikely to receive a clearing message 119 for a given authorized transaction. An inability to predict if and when clearing message 119 will arrive for each authorized transaction limits an ability of issuing bank 110 to plan and adjust its operations on a daily basis.

After clearing, the transaction is settled between merchant 104, merchant bank 106, and issuing bank 110. Settlement refers to the transfer of financial data or funds between the merchant's account, merchant bank 106, and issuing bank 110 related to the transaction. Usually, transactions are accumulated into a "batch," which is settled as a group.

Payment processor 108 stores data 121 extracted from authorization request messages 105 and/or 107 and/or authorization response messages 109 and/or 111, and clearing message 119 in a transaction history database 112. Modelling platform 120 is configured to use data 121 to generate an operational predictive model 130 for predicting a likelihood that clearing message 119 for a particular authorized transaction will be received within a given time interval, and/or a likelihood that the actual transaction amount in the clearing message 119 will differ from the tentative amount in authorization request message 107.

In example embodiments, modelling platform 120 includes a training set builder module 122 configured to submit one or more queries 123 to database 112 to retrieve subsets 125 of data 121, and to use those subsets 125 to build training data sets 127 for generating operational predictive model 130. For example, query 123 is configured to retrieve certain fields from data 121 for transactions authorized during a specified historical time period, such as one year, as subset 125. The fields in subset 125 may include, for each authorized transaction, one or more of an authorization date, a clearing date (if the transaction has cleared), a merchant identifier, a merchant category code (i.e., how the payment processor 108 classifies the type of business that the merchant is in), an account number entry code identifying how the payment account was input (e.g., by reading a chip on a physical payment card or via e-commerce), a pre-authorization code designating whether the authorization request message was a pre-authorization not intended to represent an actual charged amount, an acquirer code identifying the merchant bank 106, a country code representing the country in which the transaction was initiated, and the like.

In example embodiments, training set builder module 122 is configured to derive training data sets 127 from retrieved subsets 125. Each training data set 127 corresponds to a historical authorized transaction ("historical" in this context means completed in the past, as opposed to completed in real-time with respect to the time of retrieval by training set builder module 122). Each training data set 127 includes "model input" data fields along with at least one "result" data field representing a clearing message parameter for the transaction. The model input data fields represent factors that may be expected to, or unexpectedly be found during model training to, have some correlation with the clearing message parameter, which may include clearing message latency for the transaction, and/or a clearing message transaction amount that differs from the tentative amount cited in the authorization request message.

In example embodiments, the at least one result data field includes one or more "delay" result data fields that represent an actual delay between authorization and receipt by the payment processor 108 of the corresponding clearing message 119. To accommodate authorized transactions for which no clearing message was ever received, the one or more delay result data fields may be a single data field (e.g., number of hours or days between authorization and clearing) and may be set to a very large value to represent no clearing message received. Alternatively, the one or more delay result data fields may include a first delay result data field that is a flag to indicate whether or not a clearing message for the transaction was ever received, and a second delay result data field that is ignored if the flag indicates no clearing message, and set to a value representing the delay (e.g., number of hours or days between authorization and clearing) if the flag indicates a clearing message was received.

Further, the at least one result data field may include one or more "amount" result data fields that represent a change in transaction amount between authorization and the received clearing message. The one or more amount result data fields may be a single data field (e.g., amount of change in currency units or percentage), and may be set to zero if no clearing message was received. Alternatively, the one or more amount result data fields may include a first amount result data field that is a flag to indicate whether or not a clearing message for the transaction was ever received, and a second amount result data field that is ignored if the flag indicates no clearing message, and set to a value representing the amount of change (e.g., in currency units or percentage) if the flag indicates a clearing message was received. The delay result data field flag for no clearing message may also be employed as the amount result data field flag.

In example embodiments, the model input data fields in training data sets 127 are generated from data fields in subset 125 corresponding to historical authorization request messages 105. In other words, the trained machine learning model 129 produced by model trainer module 124 for use by operational predictive model module 130 is trained to make predictions based on input values that can be generated from the data fields in authorization request messages 105. This provides a technical advantage because the formatting of authorization request messages 105 as described above (e.g., based on ISO 8583 or ISO 20022) enables rapid extraction of the needed values (e.g., from standard, predefined byte locations in the message, rather than from a search of the whole message) to generate model inputs. Accordingly, using model input values generated from authorization request messages 105 facilitates near real-time application of the trained machine learning model 129, by operational predictive model module 130 to pending authorization request messages 105, to make predictions about subsequent clearing parameters, so that the predictions can be returned to payment processor 108 and embedded in authorization request messages 107 as routed to issuers 110. Alternatively, at least one model input data field in training data sets 127 is generated from data fields in subset 125 that do not correspond to historical authorization request messages 105.

Values in the model input data fields may include values copied directly from values in a corresponding data field in the retrieved subset 125, and/or values generated by modifying, combining, or otherwise operating upon values in one or more data field in the retrieved subset 125. The "copied" model input data fields may include one or more of the merchant identifier, the merchant category code, the account number entry code, the pre-authorization code, the acquirer code, the country code, and the like. The use of such data fields as model input data fields facilitates the machine learning model in weighing these factors directly. For example, merchant identifiers for large retailers may be associated with different never-cleared transaction rates as compared to merchant identifiers associated with small retailers, rendering the merchant identifier a useful model input value for training the machine learning model to predict a likelihood of never clearing for new transactions. Similarly, merchants in certain countries may be less likely to change the transaction amount between authorization and clearing, rendering the country code a useful model input value for training the machine learning model to predict a likelihood of the cleared transaction amount differing from the authorized transaction amount.

The "generated" model input data fields may include one or more of a "meta" merchant category (e.g., merchant category codes related to a given broader industry may be grouped together, and the value in this "meta" field may indicate which "grouping" the merchant category code for the corresponding historical authorized transaction falls into), a "meta" account number entry mode (i.e., groupings of related account number entry codes, such as "card present" versus "online"), an authorization day-of-week code (e.g., a value indicating which of the seven days of the week the authorization occurred on, or alternatively indicating weekday or weekend), a holiday proximity code (e.g., whether authorization occurred on or just before a holiday), and the like. For example, certain industries may have different never-cleared transaction rates than other industries, rendering the generated meta merchant category a useful model input value for training the machine learning model to predict a likelihood of never clearing for new transactions. Similarly, a change in the transaction amount between authorization and clearing may be more likely to occur for an online transaction as opposed to a card-present transaction, rendering the meta account number entry mode a useful model input value for training the machine learning model to predict a likelihood of the cleared transaction amount differing from the authorized transaction amount. Likewise, transactions authorized on a weekend or holiday may take extra time to clear in some cases, rendering the authorization day-of-week code and/or holiday flag useful model input values for training the machine learning model to predict a precise clearing latency.

After training set builder module 122 generates training data sets 127, training set builder module 122 passes the training data sets 127 to model trainer module 124. In example embodiments, model trainer module 124 is configured to apply the model input data fields of each training data set 127 as inputs to one or more machine learning models. Each of the one or more machine learning models is programmed to produce, for each training data set 127, at least one output intended to correspond to, or "predict," a value of the at least one result data field of the training data set 127. "Machine learning" refers broadly to various algorithms that may be used to train the model to identify and recognize patterns in existing data in order to facilitate making predictions for subsequent new input data.

Model trainer module 124 is configured to compare, for each training data set 127, the at least one output of the model to the at least one result data field of the training data set 127, and apply a machine learning algorithm to adjust parameters of the model in order to reduce the difference or "error" between the at least one output and the corresponding at least one result data field. In this way, model trainer module 124 trains the machine learning model to accurately predict the value of the at least one result data field, such as clearing message latency, likelihood that no clearing message will be received, and/or change in transaction amount between authorization and clearing, for inputs derived in real-time from new authorization request messages 105 transmitted to payment processor 108. In other words, model trainer module 124 cycles the one or more machine learning models through the training data sets 127, causing adjustments in the model parameters, until the error between the at least one output and the at least one result data field falls below a suitable threshold, and then uploads at least one trained machine learning model 129 to operational predictive model module 130 for application to a stream of real-time authorization request messages 105. In example embodiments, model trainer module 124 may be configured to simultaneously train multiple candidate machine learning models and to select the best performing candidate for each result data field, as measured by the "error" between the at least one output and the corresponding result data field, to upload to operational predictive model module 130.

In example embodiments, the one or more machine learning models may include one or more neural networks, such as a convolutional neural network, a deep learning neural network, or the like. The neural network may have one or more layers of nodes, and the model parameters adjusted during training may be respective weight values applied to one or more inputs to each node to produce a node output. In other words, the nodes in each layer may receive one or more inputs and apply a weight to each input to generate a node output. The node inputs to the first layer may correspond to the model input data fields, and the node outputs of the final layer may correspond to the at least one output of the model, intended to predict the at least one result data field. One or more intermediate layers of nodes may be connected between the nodes of the first layer and the nodes of the final layer. As model trainer module 124 cycles through the training data sets 127, model trainer module 124 applies a suitable backpropagation algorithm to adjust the weights in each node layer to minimize the error between the at least one output and the corresponding result data field. In this fashion, the machine learning model is trained to produce output that reliably predicts the corresponding result data field. Alternatively, the machine learning model has any suitable structure. In some embodiments, model trainer module 124 provides an advantage by automatically discovering and properly weighting complex, second- or third-order, and/or otherwise nonlinear interconnections between the model input data fields and the at least one output. Absent the machine learning model, such connections are unexpected and/or undiscoverable by human analysts.

In example embodiments, the at least one output may be formatted as a range and/or confidence prediction. For example, the at least one output value for clearing message latency may include one of a plurality of time ranges or "buckets." For example, the buckets may be defined as zero to 10 minutes, 10 minutes to two hours, two hours to one day, one day to three days, three days to one week, one week to three weeks, three weeks to two months, and never-cleared, and the at least one result data field in training data sets 127 includes a generated field that translates the actual clearing latency derived from the retrieved subset 125 for each transaction into one of the buckets. The trained machine learning model 129 is trained to predict the correct clearing message latency bucket for each set of model input data with, e.g., a 95 percent confidence level or a 99 percent confidence level. Additionally or alternatively, the at least one output value for clearing message latency may include a number of days before the likelihood of receiving a clearing message falls below five percent and/or below one percent, i.e., a number of days after which the account issuer can release the funds held at authorization in the expectation that no clearing message will ever be received.

Additionally or alternatively, the at least one output value for clearing message amount may include a value that represents a likelihood that the clearing message transaction amount will be the same as the tentative transaction amount cited in the authorization request message. Again, the values may represent buckets in which the clearing message transaction amount is likely to fall, e.g., less than 10 percent less than the authorization amount, between 10 and zero percent less than the authorization amount, between zero percent and 10 percent more than the authorization amount, and greater than 10 percent more than the authorization amount. Additionally or alternatively, the at least one output value for clearing message amount may include a Boolean flag indicating either that the clearing message transaction amount will very likely be the same as the tentative transaction amount cited in the authorization request message, or is less than very likely to be the same.

In example embodiments, payment processor 108 is in communication with operational predictive model module 130 and is configured to transmit incoming authorization request messages 105 in real-time and/or near real-time to operational predictive model module 130. Operational predictive model module 130 extracts and/or generates values for the model input data fields from each pending authorization request message 105, applies the values of the model input data fields to the at least one trained machine learning model 129, and transmits the values 135 of the at least one output field back to payment processor 108 in near real-time. Payment processor 108 then includes information from the output values 135 (e.g., predictions for clearing message latency and/or clearing message transaction amount) for each transaction in the processed authorization request messages 107 routed to issuer 110 in near real-time. This predictive information provided by payment processor 108 along with the initial authorization message 107 for the transaction enables issuers 110 to better plan and adjust their operations because issuers 110 now have an accurate expectation of the precise funds amounts that will need to be available for clearing each transaction, as well as an accurate expectation of the time at which clearing will occur (as well as a knowledge of when a hold on the funds in the payment account can be released because receipt of a clearing message has become unlikely).

In some embodiments, payment processor 108 is further configured to modify the conventional clearing process with issuer 110 in response to the values of the predicted clearing parameters meeting certain conditions. For example, if the value of the clearing transaction amount is predicted as very likely to match the authorization transaction amount, payment processor 108 may be configured to automatically clear the transaction on behalf of issuer 110 without transmitting clearing message 119 to issuer 110. The ability to auto-clear transactions that meet suitable thresholds improves an overall computational performance of payment processor 108, e.g., by enabling payment processor 108 to conserve payment network bandwidth and real-time computing resources that would otherwise be needed to conduct the conventional clearing process by communicating with issuer 110.

In example embodiments, after payment processor 108 has received output from operational predictive model module 130 for an authorization request message 105 in near real-time, payment processor subsequently routes the clearing message 119 (if received) for the transaction to operational predictive model module 130 to enable performance checking and/or updating of the at least one trained machine learning model 129. Operational predictive model module 130 compares the actual clearing latency and/or actual clearing transaction amount to the output predictions previously made for the corresponding authorization request message 105, and routes the comparison result 131 to a model updater module 126 of modelling platform 120. Alternatively, payment processor 108 routes clearing message 119 and/or comparison result 131 to model updater module 126. Model updater module 126 is configured to derive a correction signal 133 from comparison results 131 received for one or more transactions, and to provide correction signal 133 to model trainer module 124 to enable updating or "re-training" of the at least one machine learning model to improve performance. The retrained at least one machine learning model 129 may be periodically re-uploaded to operational predictive model module 130.

Figure 2:
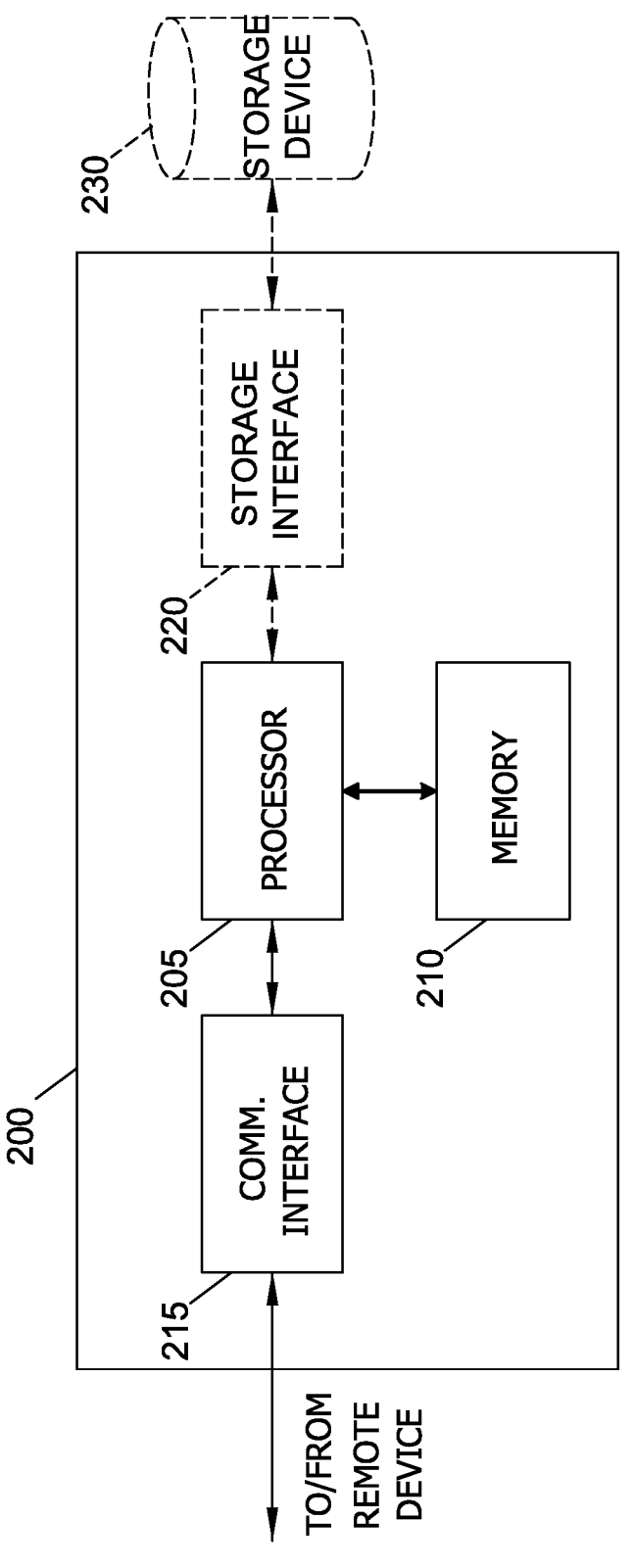

FIG. 2 is a schematic diagram of an example configuration of a server computing device 200, in accordance with some embodiments of the present disclosure. Server computing devices having an architecture similar to server computing device 200 may be used to implement one or more of the computing systems shown in FIG. 1, such as an online platform or point of sale system of merchant 104, a server system of acquirer 106, a server system of payment processor 108, a server system of issuer 110, modelling platform 120, and/or operational predictive model module 130. In the example embodiment, server computing device 200 includes processor 205 for executing instructions (not shown) stored in a memory 210. In an embodiment, processor 205 may include one or more processing units (e.g., in a multi-core configuration). The instructions may be executed within various different operating systems, such as UNIX®, LINUX® (LINUX is a registered trademark of Linus Torvalds), Microsoft Windows®, etc. It should also be appreciated that upon initiation of a computer-based method, various instructions may be executed during initialization. Some operations may be required in order to perform one or more processes described herein, while other operations may be more general or specific to a particular programming language (e.g., C, C#, C++, Java, or other suitable programming languages, etc.).

In the example embodiment, processor 205 is operatively coupled to a communication interface 215 such that server computing device 200 is capable of communicating with a remote device, such as a user or system administrator computing system (not shown) or another server computing device 200.

In the example embodiment, processor 205 is also operatively coupled to a storage device 230, which may be, for example, a computer-operated hardware unit suitable for storing or retrieving data. In some embodiments, storage device 230 is integrated into server computing device 200. For example, server computing device 200 may include one or more hard disk drives as storage device 230. In other embodiments, storage device 230 is external to server computing device 200 and may be accessed by a plurality of server computing devices 200. For example, storage device 230 may include multiple storage units such as hard disks or solid state disks in a redundant array of inexpensive disks (RAID) configuration. Storage device 230 may include a storage area network (SAN) or a network attached storage (NAS) system. Storage device 230 may be used as a repository for one or more databases or other data structures for storing various data elements received, processed, and/or generated by payment processor 108, modelling platform 120, and/or operational predictive model module 130. For example, storage device 230 is used to implement transaction history database 112 (shown in FIG. 1).

In some embodiments, processor 205 is operatively coupled to storage device 230 via an optional storage interface 220. Storage interface 220 may include, for example, a component capable of providing processor 205 with access to storage device 230. In an exemplary embodiment, storage interface 220 further includes one or more of an Advanced Technology Attachment (ATA) adapter, a Serial ATA (SATA) adapter, a Small Computer System Interface (SCSI) adapter, a RAID controller, a SAN adapter, a network adapter, or a similarly capable component providing processor 205 with access to storage device 230.

Memory area 210 may include, but is not limited to, random-access memory (RAM) such as dynamic RAM (DRAM) or static RAM (SRAM), read-only memory (ROM), erasable programmable read-only memory (EPROM), electrically erasable programmable read-only memory (EEPROM), non-volatile RAM (NVRAM), and magneto-resistive random-access memory (MRAM). The above memory types are for example only, and are thus not limiting as to the types of memory usable for storage of a computer program.

FIG. 3 is a flow diagram of an example method 300 executed by the system shown in FIG. 1. At step 302 of the example method, modelling platform 120 retrieves data subsets 125 from transaction history database 112, which stores data extracted from authorization messages (e.g., messages 105 and/or 107) and clearing messages (e.g., clearing messages 119) for a plurality of authorized transactions processed by payment processor 108.

At step 304 of the example method, modelling platform 120 derives training data sets 127 from the retrieved subsets 125. Each training data set corresponds to one of the plurality of authorized transactions and includes model input data fields and at least one result data field, as discussed above. Each at least one result data field represents a clearing message parameter (e.g., clearing message latency with respect to time of authorization or indication of never cleared, clearing transaction amount) for the authorized transaction.

At step 306 of the example method, modelling platform 120 applies the model input data fields of each training data set 127 as inputs to one or more machine learning models each programmed to produce, for each training data set 127, at least one output intended to correspond to a value of the at least one result data field of the training data set 127.

At step 308 of the example method, modelling platform 120 applies a machine learning algorithm to adjust parameters of the one or more machine learning models until an error between the at least one output and the at least one result data field falls below a threshold, e.g., until the model is suitably trained to produce predictions within a desired threshold of confidence.

At step 310 of the example method, modelling platform 120, in response to the error falling below the threshold, uploads at least one trained machine learning model of the one or more machine learning models to operational predictive model module 130.

At step 312 of the example method, modelling platform 120 applies a stream of real-time authorization request messages received from the payment processor 108 as inputs to the at least one trained machine learning model.

At step 314 of the example method, modelling platform 120 transmits, to the payment processor 108 in near real-time, values of the at least one output obtained by applying the stream.

In some embodiments, method 300 may include additional or alternative steps performed by modelling platform 120, payment processor 108, issuer 110, and/or other elements of multi-party payment processing system 100 as described herein.

As will be appreciated based on the foregoing specification, the above-described embodiments of the disclosure may be implemented using computer programming or engineering techniques including computer software, firmware, hardware or any combination or subset thereof, wherein the technical effects described above are achieved. Any such resulting program, having computer-readable code means, may be embodied or provided within one or more computer-readable media, thereby making a computer program product, (i.e., an article of manufacture), according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples, including the best mode, to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A modelling platform comprising:

at least one processor in communication with a memory device and a payment processor, wherein the at least one processor is configured to:

retrieve subsets of data from a transaction history database, wherein the transaction history database stores transaction data extracted from authorization messages and clearing data extracted from clearing messages for a plurality of authorized transactions processed by the payment processor, derive training data sets from the retrieved subsets of data, wherein each training data set corresponds to one of the plurality of authorized transactions and includes: (i) the transaction data associated with one or more authorization request messages of the one of the plurality of authorized transactions, and (ii) the clearing data associated with one or more clearing messages associated with the one of the plurality of authorized transactions;

train one or more machine learning models by applying the transaction data and the clearing data of at least a portion of the training data sets as inputs to the one or more machine learning models to predict one of: a clearing message latency for a subsequent transaction processed by the payment processor, or a clearing message amount for a subsequent transaction processed by the payment processor;

return, from the one or more trained machine learning models and for each training data set, a first output prediction for clearing message latency or a second output prediction for the clearing message amount;

derive a correction signal from: (i) a first result comparing the first output prediction to an actual clearing message latency, or (ii) a second result comparing the second output prediction to an actual clearing message amount;

periodically re-train the one or more trained machine learning models using the correction signal;

periodically re-upload the one or more re-trained machine learning models to further compare output predictions from the one or more re-trained machine learning models to at least one of actual clearing message latencies or actual clearing message amounts;

adjust parameters of the one or more trained machine learning models by applying a machine learning algorithm to the one or more re-trained machine learning models, wherein the parameters are adjusted until an error between the first or second output prediction and at least one actual result falls below a threshold indicating that the first or second output prediction is predictive of the at least one actual result, the at least one actual result representing one of an actual clearing message latency or an actual clearing message amount;

in response to the error falling below the threshold, upload at least one re-trained machine learning model of the one or more re-trained machine learning models to an operational predictive model module;

apply a data stream associated with subsequent authorization request messages received from the payment processor as inputs to the at least one re-trained machine learning model;

return, from the at least one re-trained machine learning model, at least one output obtained in response to applying the data stream to the at least one re-trained machine learning model, wherein the at least one output predicts values corresponding to at least a predicted time of issuance of a clearing message for each of the subsequent authorization request messages; and transmit, to the payment processor in real-time or near real-time, the returned at least one output, thereby providing an accurate prediction of at least one of: (i) an amount to be reserved for clearing purposes for each of the subsequent authorization request messages, or (ii) a period of time to reserve a corresponding amount before release for each of the subsequent authorization request messages.

2. The modelling platform of claim 1, wherein the at least one processor is further configured to derive model input data fields from data fields in one of the subsets of data corresponding to historical authorization request messages processed by the payment processor.

3. The modelling platform of claim 2, wherein the model input data fields include one or more of: an authorization date, a clearing date, a merchant identifier, a merchant category code, an account number entry code, a pre-authorization code, an acquirer code, or a country code.

4. The modelling platform of claim 1, wherein the at least one actual result includes one or more delay results that represent an actual delay between authorization and receipt by the payment processor of a corresponding clearing message.

5. The modelling platform of claim 1, wherein the at least one actual result includes one or more amount results that represent a change in a transaction amount between an initial authorized transaction amount and a clearing transaction amount in a corresponding clearing message.

6. The modelling platform of claim 1, wherein the one or more machine learning models include a neural network.

7. The modelling platform of claim 6, wherein the neural network comprises one or more layers of nodes, and wherein the parameters are adjusted based on respective weight values applied to one or more inputs to each of the nodes.

8. A method implemented by a modelling platform including:

the modelling platform including at least one processor in communication with a memory device and a payment processor, the method comprising steps, performed by the at least one processor, of:

retrieving subsets of data from a transaction history database, wherein the transaction history database stores transaction data extracted from authorization messages and clearing data extracted from clearing messages for a plurality of authorized transactions processed by the payment processor;

deriving training data sets from the retrieved subsets of data, wherein each training data set corresponds to one of the plurality of authorized transactions and includes: (i) the transaction data associated with one or more authorization request messages of the one of the plurality of authorized transactions, and (ii) the clearing data associated with one or more clearing messages associated with the one of the plurality of authorized transactions;

training one or more machine learning models by applying the transaction data and the clearing data of at least a portion of the training data sets as inputs to the one or more machine learning models to predict one of: a clearing message latency for a subsequent transaction processed by the payment processor, or a clearing message amount for a subsequent transaction processed by the payment processor;

returning, from the one or more trained machine learning models and for each training data set, a first output prediction for at least one of the clearing message latency or a second output prediction for the clearing message amount;

deriving a correction signal from: (i) a first result comparing the first output prediction to an actual clearing message latency, or (ii) a second result comparing the second output prediction to an actual clearing message amount;

periodically re-training the one or more trained machine learning models to adjust using the correction signal;

periodically re-upload the one or more re-trained machine learning models to further compare output predictions from the one or more re-trained machine learning models to at least one of actual clearing message latencies or actual clearing message amounts;

adjusting parameters of the one or more re-trained machine learning models by applying a machine learning algorithm to the one or more re-trained machine learning models, wherein the parameters are adjusted until an error between the first or second output prediction and at least one actual result falls below a threshold indicating that the first or second output prediction is predictive of the at least one actual result, the at least one actual result representing one of an actual clearing message latency or an actual clearing message amount;

in response to the error falling below the threshold, uploading at least one re-trained machine learning model of the one or more re-trained machine learning models to an operational predictive model module;

applying a data stream associated with subsequent authorization request messages received from the payment processor as inputs to the at least one re-trained machine learning model;

returning, from the at least one re-trained machine learning model, at least one output obtained in response to applying the data stream to the at least one re-trained machine learning model, wherein the at least one output predicts values corresponding to at least a predicted time of issuance of a clearing message for each of the subsequent authorization request messages; and transmitting, to the payment processor in real-time or near real-time, the returned at least one output, thereby providing an accurate prediction of at least one of: (i) an amount to be reserved for clearing purposes for each of the subsequent authorization request messages, or (ii) a period of time to reserve a corresponding amount before release for each of the subsequent authorization request messages.

9. The method of claim 8, further comprising:

deriving model input data fields from data fields in one of the subsets of data corresponding to historical authorization request messages processed by the payment processor.

10. The method of claim 9, wherein the model input data fields include one or more of: an authorization date, a clearing date, a merchant identifier, a merchant category code, an account number entry code, a pre-authorization code, an acquirer code, or a country code.

11. The method of claim 8, wherein the at least one actual result includes one or more delay results that represent an actual delay between authorization and receipt by the payment processor of a corresponding clearing message.

12. The method of claim 8, wherein the at least one actual result includes one or more amount results that represent a change in a transaction amount between an initial authorized transaction amount and a clearing transaction amount in a corresponding clearing message.

13. The method of claim 8, wherein the one or more machine learning models include a neural network.

14. The method of claim 13, wherein the neural network comprises one or more layers of nodes, and wherein the parameters are adjusted based on respective weight values applied to one or more inputs to each of the nodes.

15. At least one non-transitory computer-readable medium that includes computer-executable instructions embodied thereon that when the computer-executable instructions are executed by at least one processor of a modelling platform in communication with a memory device and a payment processor, the computer-executable instructions cause the at least one processor to:

retrieve subsets of data from a transaction history database, wherein the transaction history database stores transaction data extracted from authorization messages and clearing data extracted from clearing messages for a plurality of authorized transactions processed by the payment processor;

derive training data sets from the retrieved subsets of data, wherein each training data set corresponds to one of the plurality of authorized transactions and includes: (i) the transaction data associated with one or more authorization request messages of the one of the plurality of authorized transactions, and (ii) the clearing data associated with one or more clearing messages associated with the one of the plurality of authorized transactions;

train one or more machine learning models by applying the transaction data and the clearing data of at least a portion of the training data sets as inputs to the one or more machine learning models to predict one of: a clearing message latency for a subsequent transaction processed by the payment processor, or a clearing message amount for a subsequent transaction processed by the payment processor;

return, from the one or more trained machine learning models and for each training data set, a first output prediction for at least one of the clearing message latency or a second output prediction for the clearing message amount;

derive a correction signal from: (i) a first result comparing the first output prediction to an actual clearing message latency, or (ii) a second result comparing the second output prediction to an actual clearing message amount;

periodically re-train the one or more trained machine learning models using the correction signal;

periodically re-upload the one or more re-trained machine learning models to further compare output predictions from the one or more re-trained machine learning models to at least one of actual clearing message latencies or actual clearing message amounts;

adjust parameters of the one or more re-trained machine learning models by applying a machine learning algorithm to the one or more re-trained machine learning models, wherein the parameters are adjusted until an error between the first or second output prediction and at least one actual result falls below a threshold indicating that the first or second output prediction is predictive of the at least one actual result, the at least one actual result representing one of an actual clearing message latency or an actual clearing message amount;

in response to the error falling below the threshold, upload at least one re-trained machine learning model of the one or more re-trained machine learning models to an operational predictive model module;

apply a data stream associated with subsequent authorization request messages received from the payment processor as inputs to the at least one re-trained machine learning model;

return, from the at least one re-trained machine learning model, at least one output obtained in response to applying the data stream to the at least one re-trained machine learning model, wherein the at least one output predicts values corresponding to at least a predicted time of issuance of a clearing message for each of the subsequent authorization request messages; and transmit, to the payment processor in real-time or near real-time, the returned at least one output, thereby providing an accurate prediction of at least one of: (i) an amount to be reserved for clearing purposes for each of the subsequent authorization request messages, or (ii) a period of time to reserve the corresponding amount before release for each of the subsequent authorization request messages.

16. The non-transitory computer-readable medium of claim 15, wherein the computer-executable instructions further cause the at least one processor to derive model input data fields from data fields in one of the subsets of data corresponding to historical authorization request messages processed by the payment processor.

17. The non-transitory computer-readable medium of claim 16, wherein the model input data fields include one or more of: an authorization date, a clearing date, a merchant identifier, a merchant category code, an account number entry code, a pre-authorization code, an acquirer code, or a country code.

18. The non-transitory computer-readable medium of claim 15, wherein the at least one actual result includes one or more delay results that represent an actual delay between authorization and receipt by the payment processor of a corresponding clearing message.

19. The non-transitory computer-readable medium of claim 15, wherein the at least one actual result includes one or more amount results that represent a change in a transaction amount between an initial authorized transaction amount and a clearing transaction amount in a corresponding clearing message.

20. The non-transitory computer-readable medium of claim 15, wherein the one or more machine learning models include a neural network.

* * * * *